H. OTTO.
LAWN-MOWER.

No. 186,948. Patented Feb. 6, 1877.

Witnesses
Fred G. Dieterich
N. L. Allen

Inventor
Henry Otto
by DeWitt C. Allen
Atty.

UNITED STATES PATENT OFFICE.

HENRY OTTO, OF BLOOMINGTON, ILLINOIS.

IMPROVEMENT IN LAWN-MOWERS.

Specification forming part of Letters Patent No. 186,948, dated February 6, 1877; application filed November 3, 1876.

*To all whom it may concern:*

Be it known that I, HENRY OTTO, of Bloomington, in the county of McLean and State of Illinois, have invented certain new and useful Improvements in Lawn and other Mowers; and I do hereby declare that the following is a full, clear, and exact description of the same, reference being had to the accompanying drawing, making a part of this specification, in which—

Figure 1:
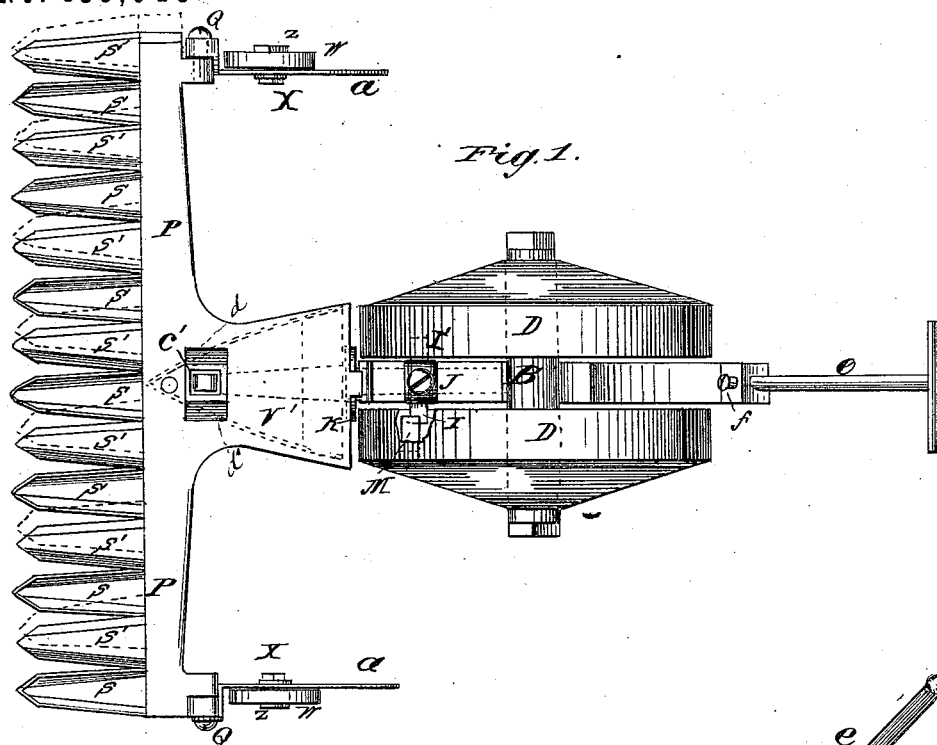
Figure 2:
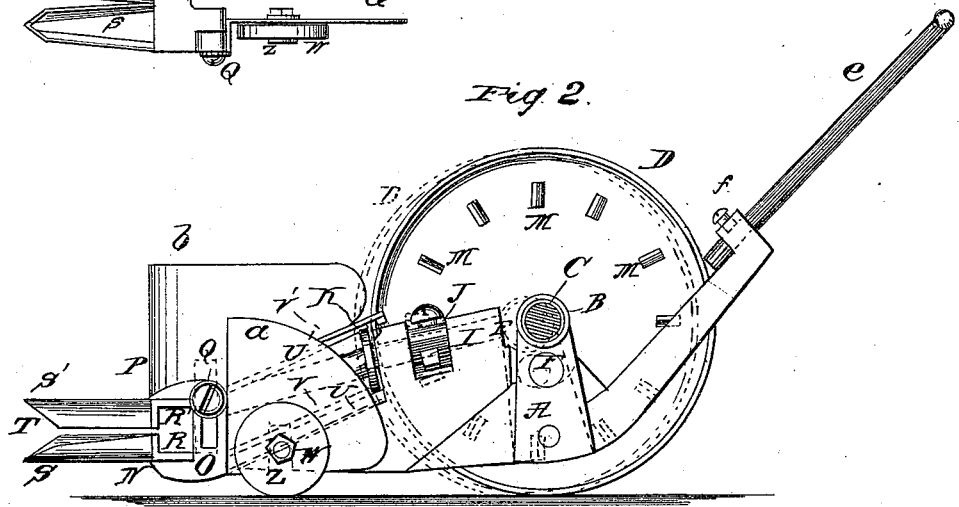
Figure 3:
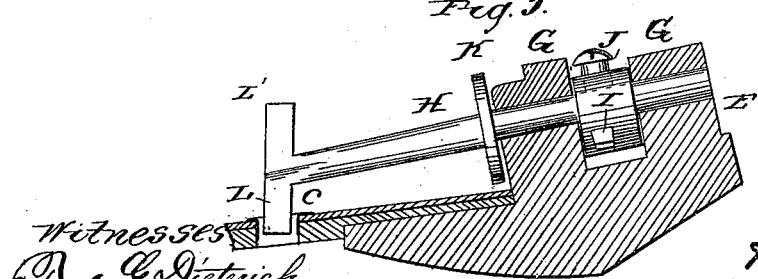

Figure 1 is a plan view of a machine embodying my improvements. Fig. 2 is a side elevation, one of the driving-wheels being removed; and Fig. 3 is a detached sectional view, showing an enlarged view of the rock-shaft.

This invention relates to certain improvements in lawn-mowers; and consists in the improved construction of the same hereinafter described and claimed.

In the accompanying drawing, similar letters of reference indicate like parts in the invention.

A pendulum-frame (designated by A) is suspended from a sleeve, B, which encircles the shaft C, upon which the driving-wheels D have their bearings, and the gear or supplemental frame E is pivoted at F in said pendulum-frame A. The front portion of the main frame E is provided with bearings G, for the reception of the upper portion of the rock-shaft H, which is provided with two lateral arms, I I', projecting from opposite sides of the same, and which rest in a notch, J, between the bearings G. The rock-shaft H is also provided with a collar, K, about midway of its length, and is further provided with two vertical arms, L L', at its front end. The driving-wheels D are provided on their interior sides with an annular row of studs or teeth, M. The said driving-wheels D are preferably made convex on their exterior faces, in order that the grass that strikes against them may not lodge upon them.

The cutter-bar N is provided at each end with a vertically-slotted extension, O, in which the covering-bar P is made vertically adjustable by the use of screws Q, in order to compensate for the wearing of the shearing-bars R R'. The lower shearing-bar R has shearing plates or teeth S, the edges of which are beveled, or project upwardly at an angle of about forty-five degrees. The upper shearing-bar R' has its teeth S', with their edges beveled or projecting downwardly at a similar angle. The points of the teeth S S' are so shaped with relation to each other as to form jaws T, which formation prevents stones, &c., when they come in contact with the points of the teeth S S', from interfering with the operation of the teeth by throwing the stones forcibly from them. The shearing-bars R R' are provided with rear extensions U U', which reach to the collar K and come in contact therewith.

The cutter-bar N and the covering-bar P are each provided with rear extensions—the former V, secured to the main frame, and the latter, V', extending over the extension U'. The cutter-bar N is mounted on small wheels W, which are adjusted by bolts X in slots Z, made in the rear extension-guards a, for the purpose of adjusting the shearing-bars to cause them to cut the grass at a height to suit the operator.

A guard, b, is secured to the covering-bar to prevent the grass from interfering with the vertical arms L L', which enter the slots c c' in the covering-bar P and the upper shearing-bar R'. Slots d d' are made in the lower shearing-bar R, and in the cutter-bar N, to give the necessary play to the rock-shaft, where it connects with the shearing-bar R.

The rocking motion is given to the rock-shaft by the teeth M on the driving-wheels D, striking alternately the lateral arms I I' on the same. The collar K lessens the friction on the rear extensions U U' of the shearing-bars R R'. The handle e is removably secured to the rear of the main frame by the screw f, and is used to propel the machine. When the machine is propelled the driving-wheels D are thrown back, the friction being upon their bottoms, and the teeth M on each wheel D engage alternately with the arms I and I', and operate the rock-shaft H, and consequently the shearing-bars R R'. The motion of the shearing plates or teeth S S' is only to the distance of about five-eighths of an inch, so that they only pass over the cutting-edges; consequently there is no danger of choking or clogging the teeth.

When the machine is drawn back by the handle, the driving-wheels D are thrown forward, as shown by dotted lines, so that the teeth M do not engage with the arms I or I', and, consequently, the machine will not be operated when it is drawn backward. A guard should be provided to cover the driving-wheels D, to protect the internal mechanism. This guard is omitted in the drawing in order to show the mechanism more plainly.

The shearing-plates S are secured to vertical flanges $g$, which are, in turn, secured to or form a part of the shearing-bars R R, the flanges and shearing-bars together forming an angle-plate, as seen in Fig. 2. The rear extensions of the upper and lower shearing-bars and the cutter-bar are shown in dotted lines in Fig. 2.

Having thus described my improvements, what I claim as new and useful, and desire to secure by Letters Patent, is—

1. The combination, with the pendulum-frame A, suspended from the sleeve B, supported by the shaft of the driving-wheels, of the gear or supplemental frame E, pivoted to the pendulum-frame, substantially as herein shown and described.

2. The rock-shaft H, having the lateral arms I I', collar K, and vertical arms L L', in combination with the slotted shearing-bars R R', having the rear extensions U U', and the driving-wheels D, having the teeth M, substantially as and for the purposes set forth.

3. The combination of the shearing-bar R, having the teeth S, beveled or projecting upwardly, and the shearing-bar R', having the teeth S', beveled or projecting downwardly, substantially as and for the purpose specified.

4. The cutter-bar N, having the vertically-slotted extension O, in combination with the covering-bar P and screws Q, substantially as set forth.

In testimony that I claim the foregoing I have hereunto set my hand this 14th day of October, 1876.

HENRY OTTO.

Witnesses:
 THOS. SLADE,
 McCANN DUNN.